Patented Apr. 9, 1935

1,996,846

UNITED STATES PATENT OFFICE 1,996,846

PRINTING LACQUER

David R. Wiggam, Kenvil, N. J., assignor to Hercules Powder Company, Wilmington, Del., a corporation of Delaware No Drawing. Application April 8, 1930, Serial No. 442,688

1 Claim. (Cl. 134—79)

My invention relates to improvement in lacquer for use in printing and more particularly for use in the printing of linoleum.

As is well known, heretofore, it has been customary to print designs on linoleum with the use of printing blocks. The medium used for printing has customarily been a so-called enamel usually comprising a varnish carrying pigment. The so-called enamel is objectionable because it dries slowly and immense dry houses are required for drying the linoleum after printing. The so-called enamel is further objectionable in view of the fact that it does not possess any substantial durability due to its lack of resistance to abrasion.

Now, it is the object of my invention to produce a lacquer which may be desirably colored by the addition of suitable pigment and which may be used for printing and more particularly for printing designs on linoleum. The lacquer in accordance with my invention will be found to possess substantial durability in that it will be relatively elastic and resistant to abrasion and, at the same time, while it will dry with substantial rapidity thus avoiding the necessity for any large drying houses, it will not dry with such rapidity as to clog the printing blocks. The lacquer in accordance with my invention may be used for printing without risk of running of the colors and will be found generally desirable and adaptable for the purpose.

The lacquer in accordance with my invention will contain nitrocellulose and as other ingredients may contain a plasticizer, a gum or resin, a diluent and a desirable pigment. The lacquer in accordance with my invention will include essentially as the solvent a terpene compound of relatively high boiling point and which is normally a solvent for nitrocellulose. The solvent may be any suitable terpene compound which is normally a solvent for nitrocellulose and which has a boiling point within about the range 180° C.–230° C. The solvent may, for example, preferably have a boiling point of around 200° C.

The solvent involved in the lacquer in accordance with my invention, as has been indicated, may be any suitable terpene compound, as for example, an ester, as terpinyl acetate, fenchyl butyrate, bornyl acetate, etc. or a ketone, as for example, fenchone, carvone, tetra-hydrocarvone, verbenone, etc., and the like, or other suitable terpene compound having the characteristics indicated and being an operable equivalent for the terpene compounds mentioned by way of example.

The various ingredients of the lacquer other than the solvent, may be varied in kind to suit conditions and likewise may be varied widely in amounts. The solvent may be used in amount within a wide range, say in amount within about the range 5–50 parts of the formula without pigment. For use under general conditions, however, the solvent will desirably be used in amount of about 30 parts of the formula without pigment.

As illustrative of a typical printing lacquer in accordance with my invention, for example, the following formula will give good results:

| | Parts |
|---|---|
| ½ second nitrocellulose | 10 |
| Ester gum | 25 |
| Xylol | 30 |
| Fenchone | 30 |
| Dibutyl phthalate | 5 |
| | 100 |
| Pigment (80% lithopone) | 25 |
| (20% zinc oxide) | |
| Total | 125 |

The lacquer in accordance with my invention will, as has been indicated, be found to dry more rapidly than the so-called enamels heretofore used in printing, more especially in printing linoleum, thus avoiding the necessity for large dry houses. At the same time the lacquer will be found to dry at a rate sufficiently slow, due to the novel solvent used, so that the film will flow to a smooth surface during initial drying without, however, any running together of the colors and also sufficiently slow so as to avoid drying of the lacquer in the grooves of the printing blocks.

The lacquer in accordance with my invention will be found to have substantial elasticity and resistance to abrasion and will be durable for the purpose intended.

It will be understood that the above formula is set out for purposes of illustration only, it being understood that the particular ingredients and proportions thereof may be varied widely within the scope of my invention, the essence of which resides in the use of a terpene compound having the characteristics specified, as the solvent ingredient of the lacquer.

Having now fully described my invention, what I claim and desire to protect by Letters Patent is:

A printing lacquer including as ingredients nitrocellulose about 10 parts, ester gum about 25 parts, xylol about 30 parts, fenchone about 30 parts, dibutyl phthalate about 5 parts and pigment about 25 parts relative to the total of the other ingredients.

DAVID R. WIGGAM.